3,272,572
DYNAMIC SEAL
Roger A. Lloyd, Huntsville, Ala., assignor to the United States of America as represented by the Secretary of Agriculture
Filed May 20, 1964, Ser. No. 369,042
2 Claims. (Cl. 308—36.1)

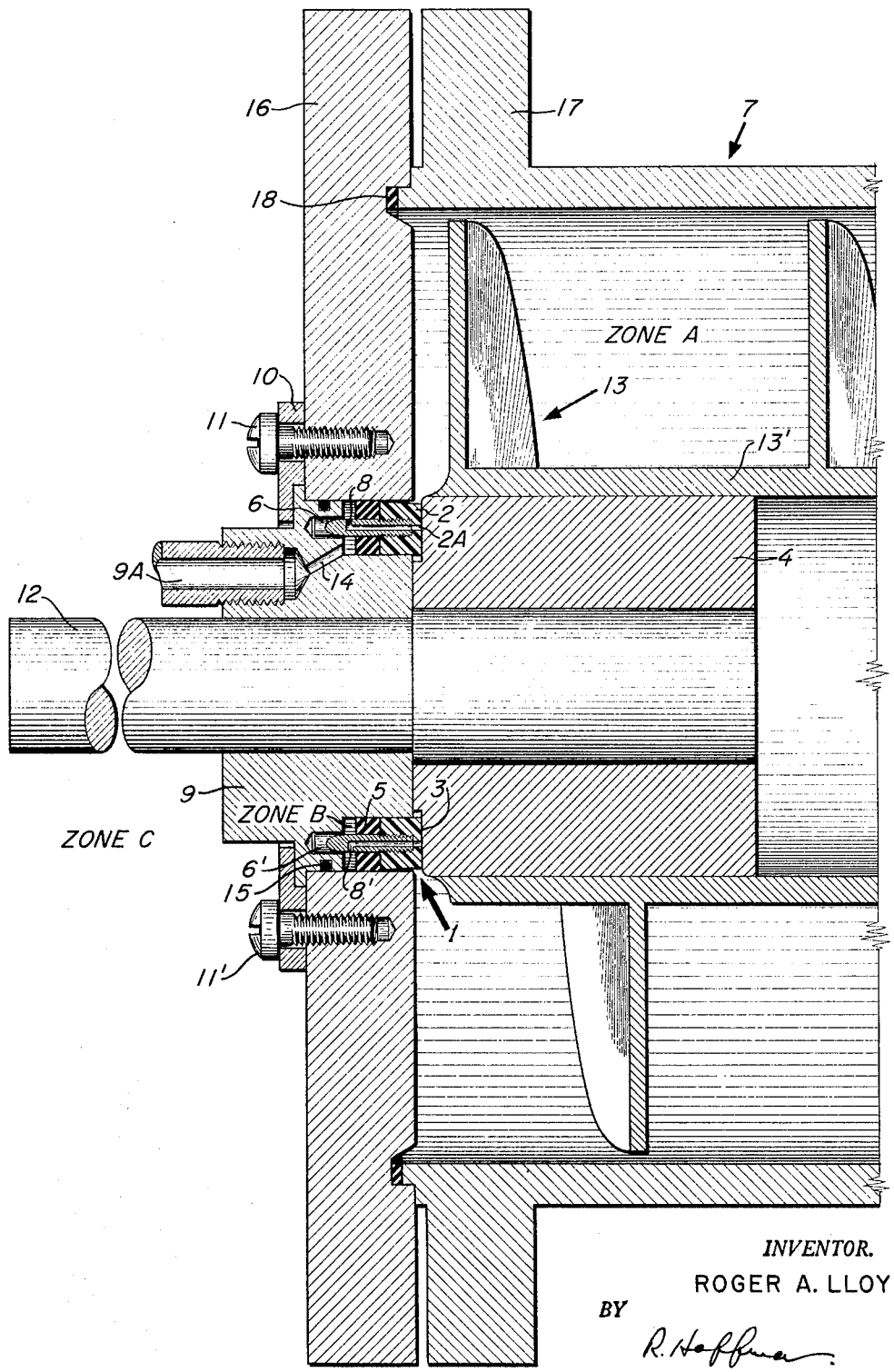

A nonexclusive, irrevocable, royalty-free license in the invention herein described throughout the world for all purposes of the United States Government, with the power to grant sublicenses for such purposes, is hereby granted to the Government of the United States of America.

This invention relates to a dynamic seal and more particularly to a rotary seal that provides a zone between the high- and low-pressure sides of said seal such that the aforesaid zone may be filled with a fluid tolerable to other fluids on both sides of the seal in such a manner that the fluid in the zone of the seal may be maintained at a higher pressure than the fluid confined to a different zone by the seal, thereby preventing leakage from an operational zone of a transfer system to a nonoperational zone. The seal herein described may be used in a transfer system for processing particles of matter with corrosive, inflammable, biological, radioactive, or other dangerous fluids and like applications well known to the art.

In dynamic seals that rely entirely on the interface between accurately machined parts, irregularities on the mating surfaces form small or large passages, depending on the precision of the machining. These passages must be reduced to molecular dimensions when a gas is to be sealed by two such surfaces, whereas larger irregularities or passages are allowable for liquid seals because of surface-tension forces. Since the passages in such dynamic seals are constantly changing size and shape due to inherent irregularities, misalinement, and vibration, leakage often occurs. As a result of the inevitable imperfections in machining and assembly, the problem of making satisfactory dynamic seals between rigid surfaces has never been completely solved. Absolute sealing is imperative when transferring or processing pressurized chemicals, dangerous biologicals, and inflammable or corrosive materials.

An object of this invention shall be to provide a simple but positive dynamic seal that does not rely on precise machining of mating parts and may still compensate for misalinement and vibration of members connected thereto, such as a rotary member and static members.

Another object of this invention shall be to provide in a dynamic seal a high-pressure zone in the seal interface to prevent leakage from said seal into nonoperational zones of a transfer system.

Another object of this invention shall be to provide in a dynamic seal anti-torque members containing high-pressure fluid ducts.

Another object of this invention shall be to provide in a dynamic seal a pliable static sealing member held in place by anti-torque members.

Another object of this invention shall be to provide in a dynamic seal a bearing ring sealing member held in place by anti-torque members.

Further objects will become apparent from the attached description and drawings wherein:

The single figure represents an enlarged cross section through the axial plane of the rotary shaft of a screw conveyor and a rotary seal illustrating the embodiments of my invention. The specific material, configuration, and components illustrated for the sake of clarity are not intended to limit the scope of my invention to less than that of all those equivalents apparent to one skilled in the art.

Referring now to the drawing, a circular ring-like dynamic seal indicated generally as 1 may be disposed coaxially within a concentric recess in main bearing member 9 contained within plate 16 such that member 9 may serve as a stationary bearing for rotary shaft 12. Shaft 12 may be fixedly and coaxially connected to sealing ring member 4 as an integral part of tubular shaft 13' and screw 13 contained within operational zone A as part of a transfer system indicated generally as 7. Plate 16 containing main bearing 9 and seal 1 may be removably attached to flange 17 of transfer system 7 by means of bolts, clamps, or the like, not shown, and sealed to said flange by flexible, concentric, static seal 18. The opposite end of extended transfer system 7, not shown, may be similar to that illustrated in FIGURE 1 and sealed by like means.

Dynamic seal 1 comprises a circular sealing ring 2 of substantial thickness disposed coaxially to shaft 12 within a concentric recess near the outer circumference of main bearing member 9 such that ring 2 may be maintained in intimate bearing contact with sealing ring member 4 at interface 3 by means of fluid pressure applied to pliable static sealing ring member 5. Said fluid pressure may be supplied as pressurized air, gas or other fluid through tube 9A and duct 14 into high-pressure circumferential zone B, thereby forcing member 5 against sealing ring 2 such that ring 2 is maintained in intimate contact with sealing ring member 4 at interface 3. Fluid from high-pressure zone B may be permitted to escape into operational zone A through ducts 8 and 8' in anti-torque members 6 and 6' respectively. Members 6 and 6' may be fixedly connected to sealing member 2 by threads or the like and may further be slidably connected to pliable static sealing member 5 and main bearing member 9 by means of holes therein. Main bearing member 9 may be removably connected within plate 16 by means of retaining ring 10 fastened by screws 11 and 11' and thereby sealing main bearing member 9 to plate 16 by means of O-ring seal 15.

Material for member 2 may be polytetrafluoroethylene or like material with low-friction bearing properties and resistance to corrosion and high temperatures. Members 5, 15, and 18 may be pliable elastomers such as silicone rubber or the like and other members may be fabricated from metals, fibers, synthetics, or other appropriate materials well known to the art.

In operation involving a hazardous substance that requires absolute confinement to operational zone A where rotary screw conveyor 13 may function as a transfer means to convey said substance to another operational zone in the transfer system, fluid pressure supplied through tube 9A and duct 14 into high-pressure zone B forces pliable static sealing member 5 to enlarge concentrically to seal against contiguous surfaces. As said member 5 forces sealing member 2 into intimate bearing contact with sealing ring member 4 at interface 3 and as sealing ring member 4 rotates with conveyor 13, fluid pressure from high-pressure zone B is transmitted through ducts 8 and 8' in anti-torque members 6 and 6' into a concentric groove 2A in member 2 at interface 3 such that said fluid may escape into zone A and around shaft 12 into zone C through any irregularities between contiguous surfaces thereby confining the hazardous substance to operational zone A. O-ring seal 15 at the interface between members 9 and 16 prevents escape of high-pressure fluid from zone B outward into low-pressure zone C.

Besides providing a positive seal, my invention also keeps corrosive media from the internal surfaces of the seal because of the high internal pressure used to produce the contact force for the mating parts.

Having thus disclosed my invention I claim:

1. A dynamic seal for sealing a rotating shaft within a high pressure system and preventing contamination of said seal comprising in combination a rotating sealing ring member secured to said shaft, and a main stationary bearing member journaled on said rotating shaft, having at the outer circumference of said main bearing member a stationary ring sealing member, one side thereof bearing against said rotating sealing ring member, the other side thereof in intimate contact with a pliable static sealing ring, fluid pressure means urging against said pliable static sealing ring, anti-torque members providing a passage for said fluid pressure means against said rotating sealing ring transversely through said stationary ring seal members such that a relatively high fluid pressure is maintained within said seal and against said rotating sealing ring member.

2. A dynamic seal comprising in combination with a stationary main bearing member having an annular groove, stationary ring sealing members within the outer portion of said groove, fluid pressure means within an inner portion of said groove urging against said stationary ring and sealing members, movable anti-torque members having means slidably attached to one of said ring sealing members at the innermost portion of said groove, said anti-torque members also having means fixedly attached to another of said ring sealing members at the outermost portion of said groove, said anti-torque members having a duct therein providing a passage for said fluid pressure means transversely through said ring sealing members.

References Cited by the Examiner

UNITED STATES PATENTS

| | | | |
|---|---|---|---|
| 1,315,822 | 9/1919 | Doran | 277—74 |
| 1,789,978 | 1/1931 | Hull | 306—36.2 |
| 1,869,955 | 8/1932 | Daugherty | 277—74 X |
| 2,364,133 | 12/1944 | De La Roza | 277—73 |
| 2,430,918 | 11/1947 | Curry | 277—73 |
| 2,469,588 | 5/1949 | Aschauer | 277—74 X |
| 2,736,265 | 2/1956 | Higgins | 277—95 X |
| 2,834,619 | 5/1958 | McNab | 277—74 X |

SAMUEL ROTHBERG, *Primary Examiner.*